United States Patent
Peng et al.

(10) Patent No.: US 11,686,914 B2
(45) Date of Patent: Jun. 27, 2023

(54) OPTICAL COMPONENT FIXING STRUCTURE AND PROJECTOR

(71) Applicant: Coretronic Corporation, Hsin-Chu (TW)

(72) Inventors: Ken-Teng Peng, Hsin-Chu (TW); Kun-Chen Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 598 days.

(21) Appl. No.: 16/717,989

(22) Filed: Dec. 17, 2019

(65) Prior Publication Data

US 2020/0200991 A1 Jun. 25, 2020

(30) Foreign Application Priority Data

Dec. 19, 2018 (CN) .......................... 201811552034.6

(51) Int. Cl.
  *G02B 7/02* (2021.01)
  *G03B 21/14* (2006.01)

(52) U.S. Cl.
  CPC ............. *G02B 7/022* (2013.01); *G02B 7/026* (2013.01); *G03B 21/145* (2013.01)

(58) Field of Classification Search
  CPC .......... G02B 7/02; G02B 7/021; G02B 7/022; G02B 7/024; G02B 7/025; G02B 7/026; G02B 7/028; G03B 21/14; G03B 21/142; G03B 21/145; G05B 2219/35411; G05B 2219/36277; G05B 2219/40381;
  (Continued)

(56) References Cited

U.S. PATENT DOCUMENTS

| 405,828 | A | | 6/1889 | Card | |
| 3,528,050 | A | * | 9/1970 | Hindenburg | ......... H01R 13/648 439/535 |

(Continued)

FOREIGN PATENT DOCUMENTS

| CN | 1680796 | 10/2005 |
| CN | 101571617 | 11/2009 |

(Continued)

OTHER PUBLICATIONS

"Office Action of China Counterpart Application", dated Apr. 6, 2021, p. 1-p. 10.

(Continued)

*Primary Examiner* — Ephrem Z Mebrahtu
(74) *Attorney, Agent, or Firm* — JCIPRNET

(57) ABSTRACT

An optical component fixing structure includes a bearer and at least two or more clamping pieces. The bearer has an accommodating opening, at least two or more sliding trenches and at least two or more protuberances. The protuberance is disposed in the sliding trench. After the clamping piece is moved into the sliding trench, the protuberance is engaged with the retaining hole and at least one of the two sidewalls covers portion of the accommodating opening to fit with the bearer to fix a lens in the accommodating opening. The invention provides a projector using the optical component fixing structure. The projector including a body, and a light source system, the optical component fixing structure, a light valve and a projecting lens are accommodated and fixed in the body.

16 Claims, 7 Drawing Sheets

(58) Field of Classification Search
CPC ...... Y10S 16/25; Y10S 152/08; Y10S 223/02; Y10S 403/01; Y10S 403/03; Y10S 403/04; Y10S 403/07; Y10S 403/09; H04N 5/2253; H04N 5/2254; H01R 4/28; H01R 4/5066
See application file for complete search history.

(56) References Cited

U.S. PATENT DOCUMENTS

| | | | | |
|---|---|---|---|---|
| 5,680,260 | A | * | 10/1997 | Farcella ................. G02B 7/022 359/818 |
| 2002/0021416 | A1 | * | 2/2002 | Ogawa ................... G03B 21/28 353/51 |
| 2016/0231641 | A1 | * | 8/2016 | Minamisawa ....... H04N 5/2257 |

FOREIGN PATENT DOCUMENTS

| | | |
|---|---|---|
| CN | 102178406 | 9/2011 |
| CN | 102669893 | 9/2012 |
| CN | 103472558 | 12/2013 |
| CN | 103472690 | 12/2013 |
| CN | 103946745 | 7/2014 |
| CN | 104914543 | 9/2015 |
| CN | 105372911 | 3/2016 |
| CN | 205992113 | 3/2017 |
| CN | 108571640 | 9/2018 |
| CN | 108692142 | 10/2018 |
| CN | 209265157 | 8/2019 |
| JP | 2008083540 | 4/2008 |
| KR | 20140032091 | 3/2014 |
| TW | M283206 | 12/2005 |
| TW | I605713 | 11/2017 |

OTHER PUBLICATIONS

"Office Action of China Counterpart Application", dated Aug. 17, 2021, p. 1-p. 5.

* cited by examiner

OPTICAL COMPONENT FIXING STRUCTURE AND PROJECTOR

CROSS-REFERENCE TO RELATED APPLICATION

This application claims the priority benefit of China application serial no. 201811552034.6, filed on Dec. 19, 2018. The entirety of the above-mentioned patent application is hereby incorporated by reference herein and made a part of this specification.

BACKGROUND OF THE INVENTION

1. Field of the Invention

The invention relates to a fixing structure and a projector, in particular, to an optical component fixing structure and a projector with this optical component fixing structure.

2. Description of Related Art

A projector is displaying equipment configured to generate an image. An imaging principle of the projector is to convert an illuminating beam generated by a light source into an image beam through a light valve and then project the image beam to a projection curtain or a wall through a projecting lens to form an image. Along with progress of projecting technology and reduction of manufacturing cost, the use of projectors has been gradually extended from commercial purposes to family uses.

There are too many assembling steps and parts involved in an existing assembling manner for assembling an existing lens in a projector, which brings excessively high time consumption and cost in assembling of the lens and makes the whole assembling process too complicated and unfavorable for introduction of automated production.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides an optical component fixing structure and a projector with the same, which may reduce assembling parts and steps, thereby simplifying an assembling process, facilitating reduction of assembling time and achieving favorability for introduction of automated production.

Other objectives and advantages of the invention may be further understood from the technical features disclosed in the invention.

In order to achieve one, some, or all of the aforementioned objectives or other objectives, an embodiment of the invention discloses an optical component fixing structure, which includes a bearer and at least two or more clamping pieces. The bearer has an accommodating opening, at least two or more sliding trenches and at least two or more protuberances. The protuberance is disposed in the sliding trench. The sliding trench has a thickness and a first width. Each of the clamping pieces has two sidewalls, a vertical wall connected between the two sidewalls and a retaining hole formed in the sidewall. A distance between the two sidewalls is matched with the thickness of the sliding trench and second widths of the two sidewalls are correspondingly matched with the first width of the sliding trench. After the clamping piece is moved into the sliding trench, the protuberance is engaged with the retaining hole and at least one of the two sidewalls covers portion of the accommodating opening.

In order to achieve one, some, or all of the aforementioned objectives or other objectives, an embodiment of the invention discloses a projector, which includes a body, a light source system, an optical component fixing structure, a light valve and a projecting lens being accommodated and fixed in the body. The light source system provides a beam. The light valve converts the beam into an image beam. The projecting lens projects the image beam. The optical component fixing structure includes a bearer and at least two or more clamping pieces. The bearer has an accommodating opening, at least two or more sliding trenches and at least two or more protuberances. The protuberance is disposed in the sliding trench and the sliding trench has a thickness and a first width. Each of the clamping pieces has two sidewalls, a vertical wall connected between the two sidewalls and a retaining hole formed in the sidewall. A distance between the two sidewalls is matched with the thickness of the sliding trench and second widths of the two sidewalls are correspondingly matched with the first width of the sliding trench. After the clamping piece is moved into the sliding trench, the protuberance is engaged with the retaining hole and at least one of the two sidewalls covers portion of the accommodating opening.

Based on the foregoing, the embodiments of the invention have at least one of the following advantages or effects. In the optical component fixing structure and the projector of the invention, the protuberance is disposed in the sliding trench. The sliding trench has the thickness and the first width. Each of the clamping pieces has the two sidewalls, the vertical wall connected between the two sidewalls and the retaining hole formed in the sidewall. The distance between the two sidewalls is matched with the thickness of the sliding trench and the second widths of the two sidewalls are correspondingly matched with the first width of the sliding trench. Accordingly, after the clamping piece is moved into the sliding trench, the protuberance is engaged with the retaining hole and at least one of the two sidewalls covers portion of the accommodating opening. The clamping pieces may be moved into the sliding trenches to be fixedly located on the bearer, and any object in the accommodating opening may also be positioned. In such a manner, assembling parts and steps may be reduced, thereby simplifying an assembling process, facilitating reduction in assembling time and achieving favorability for automatic guiding-in.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
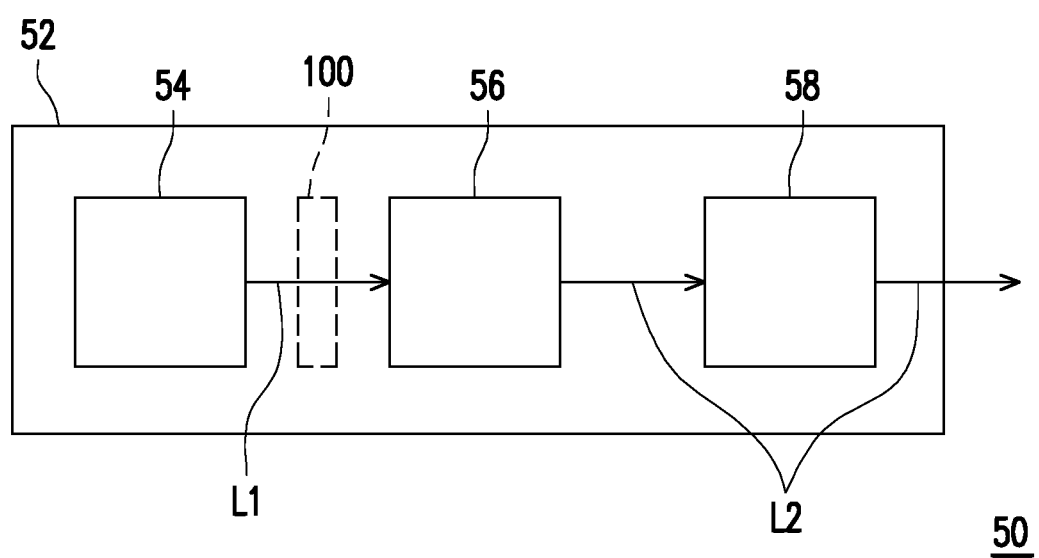
FIG. 1 is a schematic view of a projector according to an embodiment of the invention.

FIG. 1 is a schematic view of a projector according to an embodiment of the invention. Referring to FIG. 1, the projector 50 of the embodiment includes a body 52, a light source system 54, a light valve 56 and a projecting lens 58. The light source system 54, an optical component fixing structure 100, the light valve 56 and the projecting lens 58 are accommodated and fixed in the body 52. The light source system 54 provides a beam L1. The light valve 56 is, for example, a digital micro-mirror device (DMD) and converts the beam L1 into an image beam L2. The type of the light valve 56 is not limited. In other embodiments, the light valve may be a reflection type or transmission type spatial light modulator. The reflection type spatial light modulator is, for example, a reflection type liquid crystal on silicon (LCOS). The transmission type spatial light modulator is, for example, a transparent liquid crystal panel. In addition, according to different control signal input manners, the light valve is, for example, an optically addressed spatial light modulator (OASLM) or an electrically addressed spatial light modulator (EASLM). The form and type of the light valve are not limited in the invention. In addition, the projecting lens 58 projects the image beam L2.

Figure 2A:
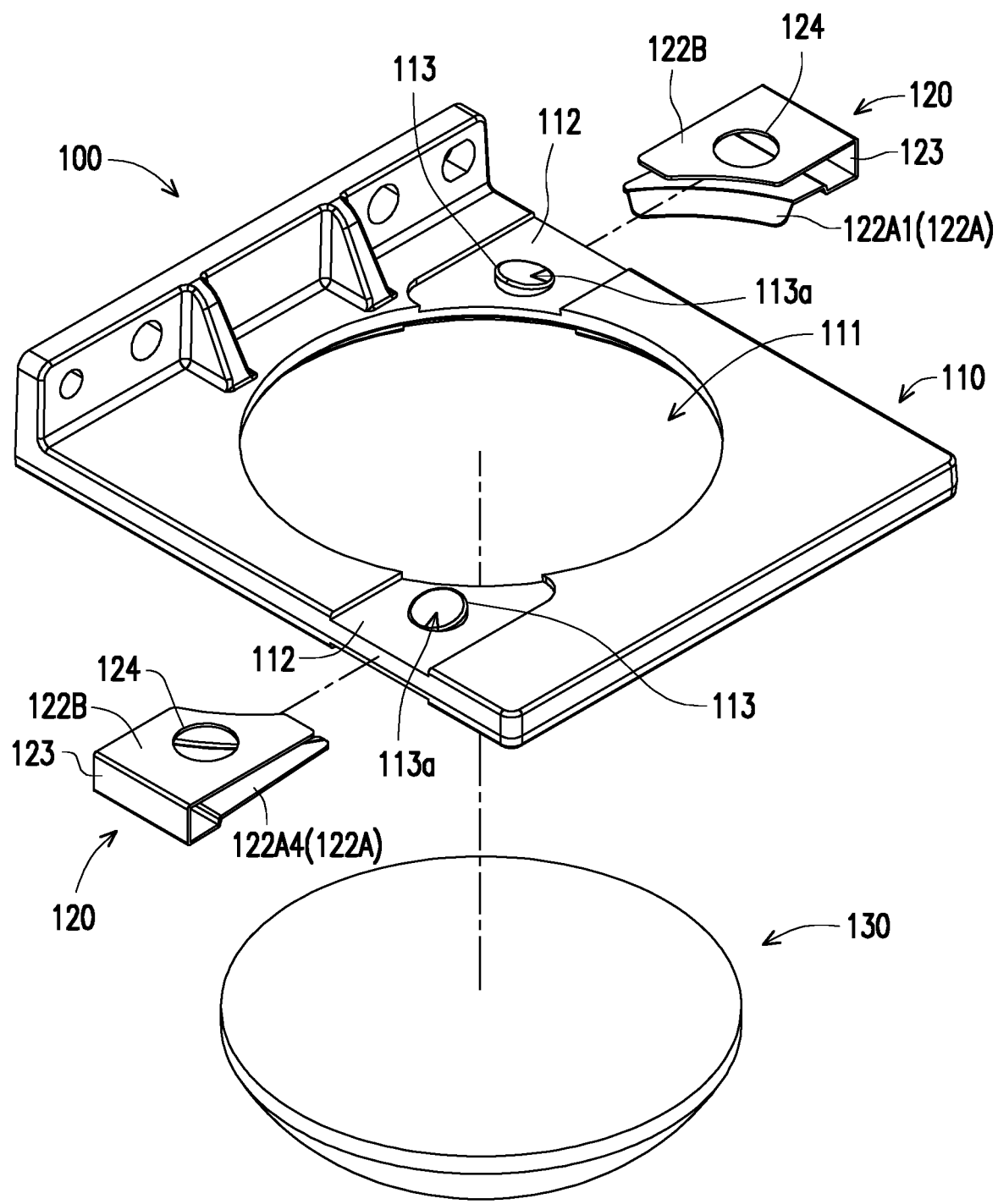
FIG. 2A is a three-dimensional schematic view of an optical component fixing structure before assembling according to an embodiment of the invention.
Figure 2B:
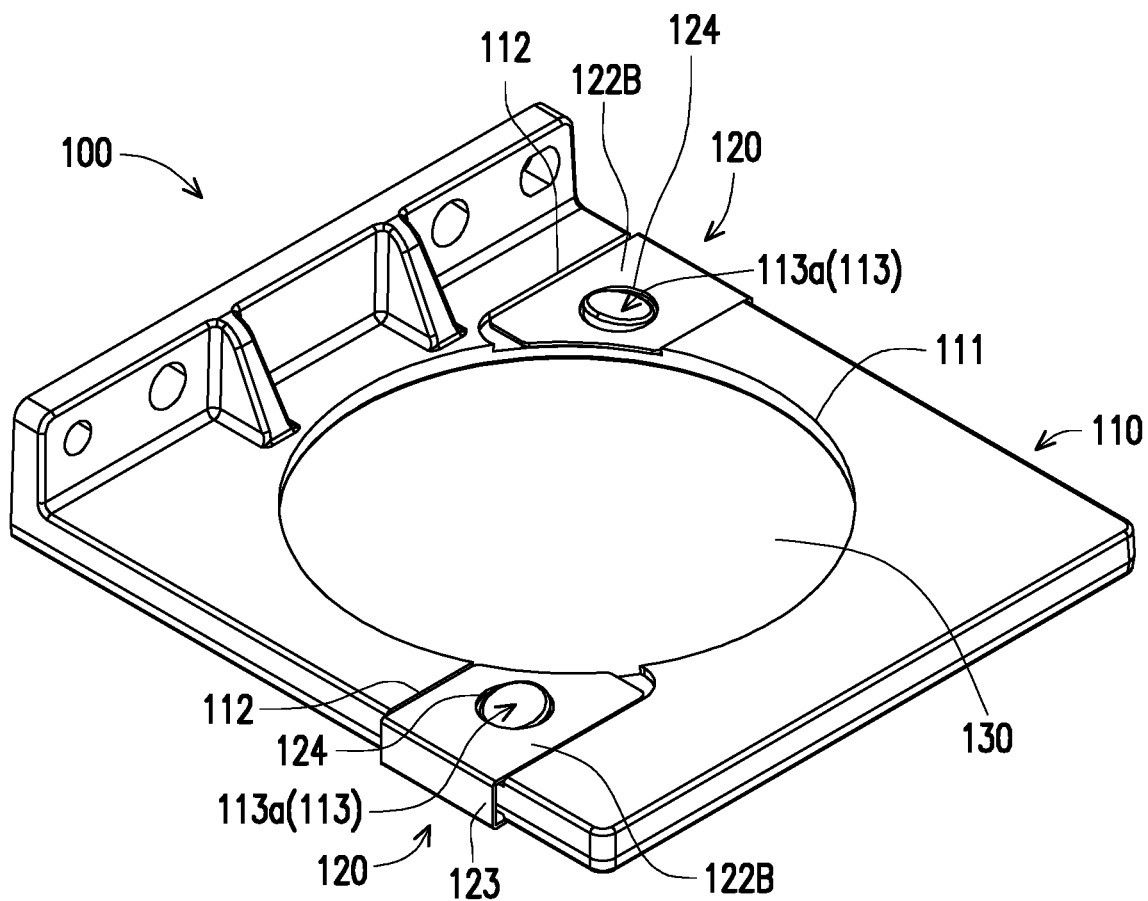
FIG. 2B is a three-dimensional schematic view of an optical component fixing structure after assembling according to an embodiment of the invention.
Figure 3:
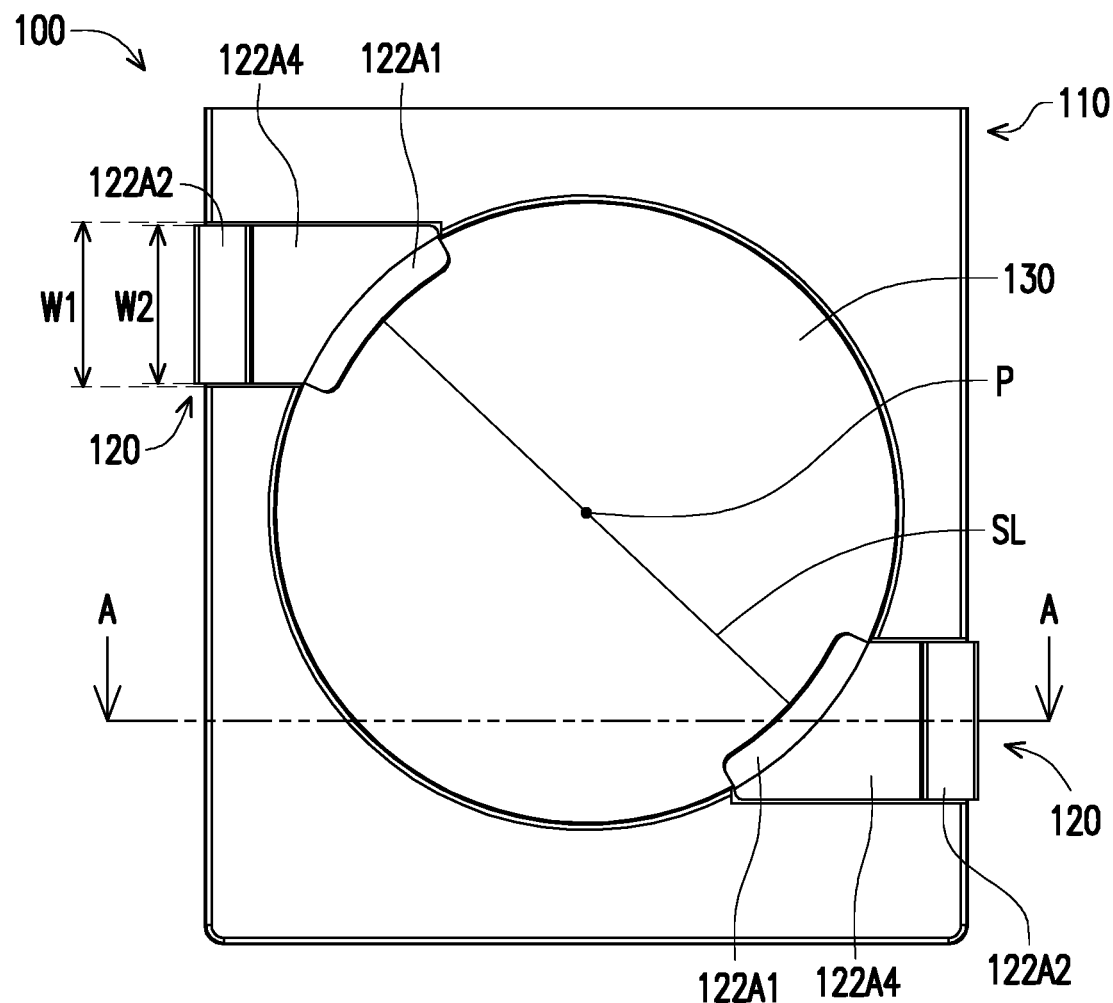
FIG. 3 is a schematic bottom view of the optical component fixing structure after assembling in FIG. 2B.
Figure 4:
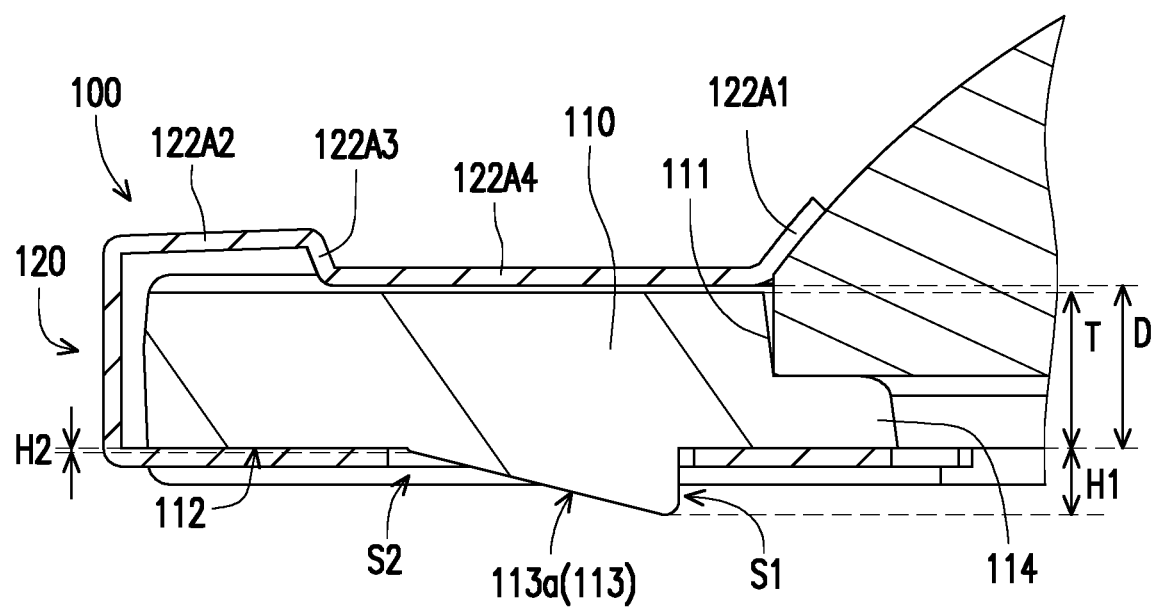
FIG. 4 is a part schematic cross-sectional view of the optical component fixing structure in FIG. 3 along an A-A section.

FIGS. 2A and 2B are three-dimensional schematic views of an optical component fixing structure 100 before assembling and after assembling according to an embodiment of the invention. FIG. 3 is a schematic bottom view of the optical component fixing structure 100 in FIG. 2B. FIG. 4 is a part schematic cross-sectional view of the optical component fixing structure 100 in FIG. 3 along an A-A section. Referring to FIG. 2A and FIG. 2B, the optical component fixing structure 100 includes a bearer 110 and at least two or more clamping pieces 120. The bearer 110 has an accommodating opening 111, at least two or more sliding trenches 112 and at least two or more protuberances 113. Further referring to FIG. 3 and FIG. 4, the protuberance 113 is disposed in the sliding trench 112. The sliding trench 112 has a thickness T and a first width W1. Each of the clamping pieces 120 has two sidewalls 122A and 122B, a vertical wall 123 connected between the two sidewalls 122A and 122B and a retaining hole 124 formed in at least one sidewall (for example, the sidewall 122B). A distance D between the sidewall 122A and the sidewall 122B is matched with a first thickness T1 of the sliding trench 112. Each of the sidewall 122A and the sidewall 122B has a second width W2 and the second width W2 is matched with the first width W1 of the sliding trench 112. As shown in FIG. 2A to FIG. 2B, after the clamping piece 120 is moved into the sliding trench 112, the protuberance 113 is engaged with the retaining hole 124 and the sidewall 122A covers portion of the accommodating opening 111. In other embodiments, the sidewall 122B covers portion of the accommodating opening 111. In an embodiment, the sidewall 122A and the sidewall 122B may be designed to be provided with different widths respectively according to a requirement of a user.

In the present embodiment, the numbers of the clamping pieces 120, the sliding trenches 112 and the protuberances 113 are, but not limited to, two. In other embodiments, the numbers of the clamping pieces 120, the sliding trenches 112 and the protuberances 113 may also be two or more than. As shown in FIG. 3, when the number of the clamping pieces 120 is two, the two clamping pieces 120 may be disposed at two opposite corners of the bearer 110.

In addition, in the present embodiment, the protuberance 113 corresponds to the sidewall 122B. In other embodiments, the protuberance 113 may also correspond to the sidewall 122A, or the sidewall 122A and the sidewall 122B correspond to the protuberance 113 and another protuberance (not shown in the figures) respectively.

In the present embodiment, the protuberance 113 has a guide bevel 113a. The guide bevel 113a has a first side S1 and a second side S2 opposite to each other. The first side S1 is close to the accommodating opening 111 and the second side S2 is far away from the accommodating opening 111. A first height H1 of the first side S1 of the guide bevel 113a is larger than a second height H2 of the second side S2 of the guide bevel 113a, and the second height H2 is larger than 0. In other embodiments, the second height H2 of the second side S2 may be 0. Accordingly, in a process that the clamping piece 120 slides into the sliding trench 112, the sidewall 122B may move along the guide bevel 113a. As shown in FIG. 4, after the clamping piece 120 is completely moved into the sliding trench 112, the protuberance 113 is engaged with the retaining hole 124 located in the sidewall 122B. At the moment, the first side S1 of the protuberance 113 is pressed against the retaining hole 124 and thus an effect of preventing the clamping piece 120 from being separated from the bearer 110 may be achieved by the protuberance 124. In an embodiment, the first side S1 and the second side S2 of the protuberance 113 may have the same height. It is to be understood that the protuberance 113 may cooperate with the retaining hole 124 to prevent the clamping piece 120 from sliding in any direction parallel to a plane of the accommodating opening 111. Therefore, shapes of the protuberance 113 and the retaining hole 124 may be designed into various shapes according to a requirement and, for example, may be ellipses, semicircles and rectangles.

In the present embodiment, the optical component fixing structure 100 further includes a lens 130. The lens 130 is placed in the accommodating opening 111 and the lens 130 is located on a transmission path of the beam L1.

Figure 5:
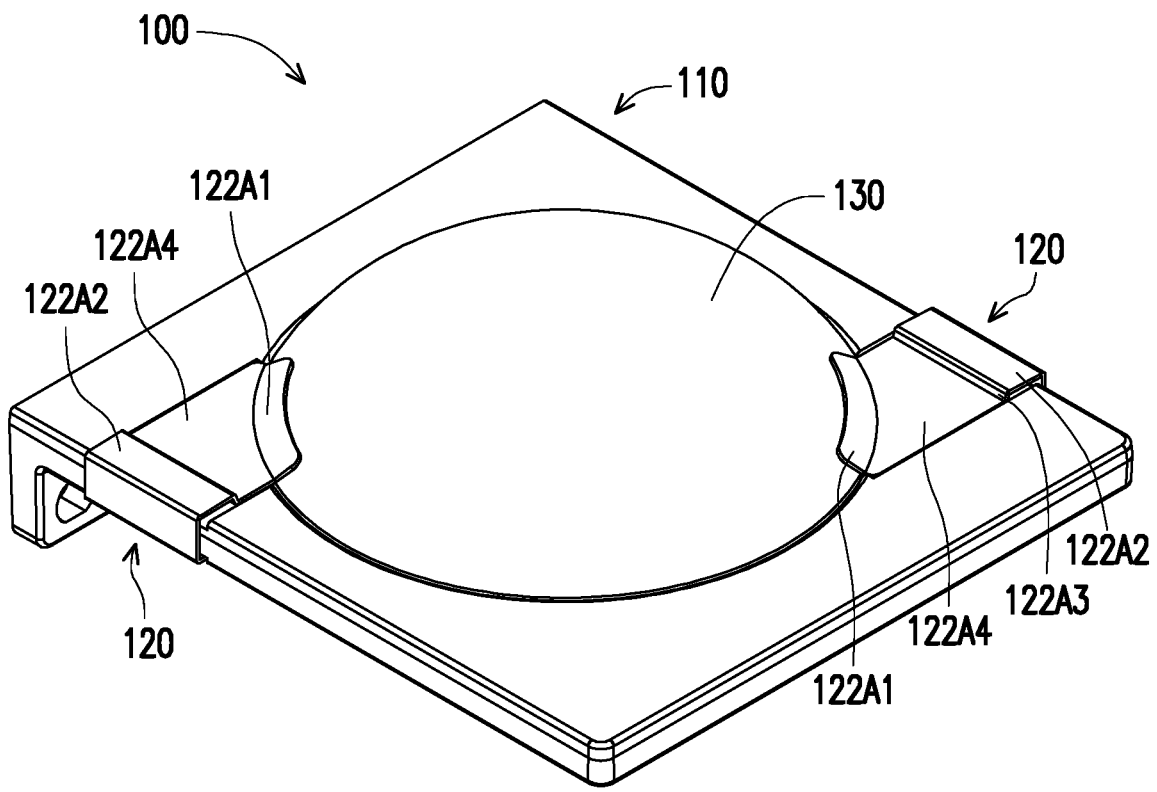
FIG. 5 is a three-dimensional schematic view of the optical component fixing structure in FIG. 3 at another angle.

FIG. 5 is a three-dimensional schematic view of the optical component fixing structure in FIG. 3 at another angle. Referring to FIG. 4 and FIG. 5, at least one (for example, the sidewall 122A) of the two sidewalls of the present embodiment includes a pressing portion 122A1, a bending portion 122A2, a connecting portion 122A3 and an extending portion 122A4. The bending portion 122A2 is connected to the vertical wall 123 in a bending manner. The connecting portion 122A3 is connected to the bending portion 122A2 in the bending manner. The extending portion 122A4 is connected to the connecting portion 122A3 in the bending manner. The pressing portion 122A1 is connected to the extending portion 122A4 in the bending manner.

Referring to FIG. 2B, FIG. 3 and FIG. 4, the bearer 110 further includes a carrying portion 114 and an edge of the lens 130 may be carried on the carrying portion 114. When the clamping piece 120 slides into the sliding trench 112 and the protuberance 113 is engaged with the retaining hole 124, the pressing portion 122A1 may be pressed against the lens 130, as shown in FIG. 5, so as to clamp and position the lens 130 between the carrying portion 114 and the pressing portion 122A1. A shape of the lens 130 may include an arc surface and a shape of the portion of the pressing portion 122A1 pressed against the lens 130 may be matched with the shape of the lens 130. In other words, the pressing portion 122A1 and the carrying portion 114 may jointly clamp the lens 130 therebetween, and the shape of the pressing portion 122A1 is matched with the shape of the lens 130 and may include any shape, for example, an arc surface and a curved surface, attached to a surface of the lens.

In other embodiments, the bearer 110 may also not have the carrying portion 114 and the clamping piece 120 may be provided with two pressing portions located at tail ends of the two sidewalls 122A and 122B respectively (not shown in the figures).

In the present embodiment, with adoption of the design that the bending portion 122A2, the connecting portion 122A3 and the extending portion 122A4 are mutually connected in the bending manner, a clamping force during clamping of the clamping piece 120 at the bearer may be improved and improvement in reliability of fixing the lens 130 by the clamping piece 120 is facilitated. It is to be understood that the bending connection design of the bending portion 122A2, the connecting portion 122A3 and the extending portion 122A4 may be changed and regulated according to a requirement of the user on the clamping force.

As shown in FIG. 3, in the present embodiment, each of the pressing portions 122A1 of the two clamping pieces 120 cover the accommodating opening 111 and a connection SL between positions where the two pressing portions 122A1 cover the accommodating opening 111 passes a central point P of the accommodating opening 111. In addition, the connection SL substantially also passes a center of the lens 130. Accordingly, the lens 130 may be effectively positioned in the accommodating opening 111.

Figure 6:
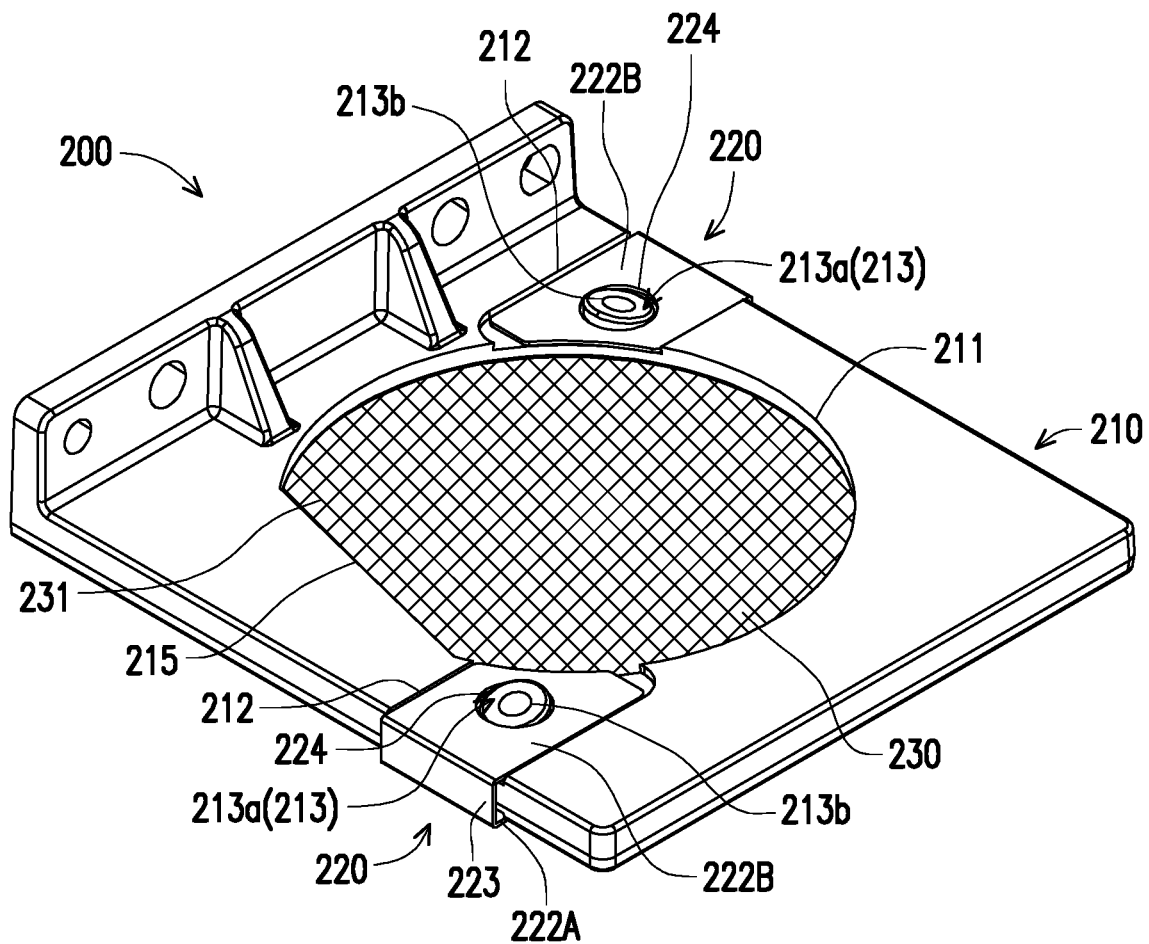
FIG. 6 is a three-dimensional schematic view of an optical component fixing structure according to another embodiment of the invention.

FIG. 6 is a three-dimensional schematic view of an optical component fixing structure 200 according to another embodiment of the invention. The optical component fixing structure 200 in the embodiment shown in FIG. 6 includes a bearer 210 and at least two clamping pieces 220. The bearer 210 includes an accommodating opening 211, sliding trenches 212 and protuberances 213, and the protuberance 213 has a guide bevel 213a. Each of the clamping pieces 220 includes two sidewalls 222A and 222B, a vertical wall 223 and a retaining hole 224. Arrangement and acting manners for a lens 230 are similar to arrangement and fixed acting manners in the optical component fixing structure 100 in FIG. 2B and the descriptions thereof are omitted herein. A difference between the embodiment shown in FIG. 6 and the embodiment shown in FIG. 2B is that the bearer 210 further includes a positioning portion 215 configured to limit a rotating degree of freedom when the lens 230 is assembled on the bearer 210 to disable the lens 230 to rotate about an optical axis after being fixed on the bearer 210 by the clamping pieces 220. In addition, the protuberance 213 may further has a threaded hole 213b formed to lock a screw (not shown in the figure). When the screw (not shown in the figure) is locked in the threaded hole 213b, the clamping piece 220 may be fixed on the bearer 210 through the screw (not shown in the figure). In other embodiments, the threaded hole 213b may lock the screw in the bearer 210 in a threaded manner from a side of the sidewall 222A to further firmly lock the clamping piece 120 on the bearer 210. Accordingly, the optical component fixing structure 200 may further improve an effect of preventing the clamping pieces 220 from being separated from the bearer 210. In addition, the lens 230 may further include a micro-structure 231 configured to guide the beam L1 shown in FIG. 1.

Based on the foregoing, the embodiments of the invention have at least one of the following advantages or effects. In the optical component fixing structure and the projector of the invention, the optical component fixing structure includes the bearer and the at least two or more clamping pieces. The bearer has the accommodating opening, the at least two or more sliding trenches and the at least two or more protuberances. The protuberance is disposed in the sliding trench. The sliding trench has the thickness and the first width. Each of the clamping pieces has the two sidewalls, the vertical wall connected between the two sidewalls and the retaining hole formed in the sidewall. The distance between the two sidewalls is matched with the thickness of the sliding trench and the second widths of the two sidewalls are correspondingly matched with the first width of the sliding trench. Accordingly, after the clamping piece is moved into the sliding trench, the protuberance is engaged with the retaining hole and at least one of the two sidewalls covers portion of the accommodating opening. The clamping pieces may be simply moved into the sliding trenches to fixedly position any object in the accommodating opening. In such a manner, assembling steps may be reduced, thereby simplifying an assembling process, facilitating reduction in assembling time and achieving favorability for automatic guiding-in.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An optical component fixing structure for fixing a lens, comprising: a bearer and at least two clamping pieces, wherein:
   the bearer has an accommodating opening, at least two sliding trenches and at least two protuberances, the protuberance is disposed in the sliding trench, and the sliding trench has a thickness and a first width; and
   each of the clamping pieces has two sidewalls, a vertical wall connected between the two sidewalls and a retaining hole formed in the sidewall, a distance between the two sidewalls is matched with the thickness of the sliding trench, and second widths of the two sidewalls are matched with the first width of the sliding trench,
   wherein after the clamping piece is moved into the sliding trench, the protuberance is engaged with the retaining hole and at least one of the two sidewalls covers portion of the accommodating opening,
   wherein the lens is configured to be placed in the accommodating opening,
   wherein the at least one of two sidewalls comprises at least one pressing portion configured to press against the lens,
   wherein the at least one pressing portion and the protuberance are positioned at opposite sides of the bearer.

2. The optical component fixing structure according to claim 1, wherein after the clamping piece is moved into the sliding trench, at least one of the two sidewalls is configured to press against the lens.

3. The optical component fixing structure according to claim 1, wherein a shape of the lens comprises an arc surface, and a shape of the pressing portion matched with the shape of the lens comprises an arc surface.

4. The optical component fixing structure according to claim 1, wherein the protuberance has a guide bevel.

5. The optical component fixing structure according to claim 4, wherein a height of a side, close to the accommodating opening, of the guide bevel is larger than a height of a side, far away from the accommodating opening, of the guide bevel.

6. The optical component fixing structure according to claim 1, wherein at least one of the two sidewalls comprises a bending portion, a connecting portion and an extending portion, wherein:
   the bending portion is connected to the vertical wall in a bending manner;
   the connecting portion is connected to the bending portion in the bending manner; and
   the extending portion is connected to the connecting portion in the bending manner.

7. The optical component fixing structure according to claim 1, wherein the number of the at least two clamping pieces is two, and the two clamping pieces are disposed at two opposite corners of the bearer.

8. The optical component fixing structure according to claim 7, wherein a connection between positions where the two clamping pieces cover the accommodating opening passes a central point of the accommodating opening.

9. A projector, comprising a body, and a light source system, an optical component fixing structure, a light valve and a projecting lens being accommodated and fixed in the body, wherein:
   the light source system provides a beam;
   the light valve converts the beam into an image beam;
   the projecting lens projects the image beam; and
   the optical component fixing structure is configured to fix a lens, the optical component fixing structure comprises a bearer and at least two clamping pieces, wherein:
   the bearer has an accommodating opening, at least two sliding trenches and at least two protuberances, the protuberance is disposed in the sliding trench and the sliding trench has a thickness and a first width; and
   each of the clamping pieces has two sidewalls, a vertical wall connected between the two sidewalls and a retaining hole formed in the sidewall, a distance between the two sidewalls is matched with the thickness of the sliding trench, and second widths of the two sidewalls are matched with the first width of the sliding trench,
   wherein after the clamping piece is moved into the sliding trench, the protuberance is engaged with the retaining hole and at least one of the two sidewalls covers portion of the accommodating opening, wherein the lens is configured to be placed in the accommodating opening, wherein the at least one of two sidewalls comprises at least one pressing portion configured to press against the lens, wherein the at least one pressing portion and the protuberance are positioned at opposite sides of the bearer.

10. The projector according to claim 9, wherein after the clamping piece is moved into the sliding trench, at least one of the two sidewalls is configured to press against the lens.

11. The projector according to claim 10, wherein a shape of the lens comprises an arc surface, and a shape of the pressing portion matched with the shape of the lens comprises an arc surface.

12. The projector according to claim 9, wherein the protuberance has a guide bevel.

13. The projector according to claim 12, wherein a height of a side, close to the accommodating opening, of the guide bevel is larger than a height of a side, far away from the accommodating opening, of the guide bevel.

14. The projector according to claim 9, wherein at least one of the two sidewalls comprises a bending portion, a connecting portion and an extending portion, wherein:

the bending portion is connected to the vertical wall in a bending manner;

the connecting portion is connected to the bending portion in the bending manner; and the extending portion is connected to the connecting portion in the bending manner.

15. The projector according to claim 9, wherein the number of the at least two clamping pieces is two, and the two clamping pieces are disposed at two opposite corners of the bearer.

16. The projector according to claim 15, wherein a connection between positions where the two clamping pieces cover the accommodating openings passes a central point of the accommodating opening.

\* \* \* \* \*